United States Patent
Lee et al.

(10) Patent No.: US 9,925,747 B2
(45) Date of Patent: Mar. 27, 2018

(54) OUTER COVER MATERIAL FOR VACUUM INSULATOR AND HIGH-PERFORMANCE VACUUM INSULATOR COMPRISING SAME

(71) Applicant: LG Hausys, Ltd., Seoul (KR)

(72) Inventors: Myung Lee, Suwon-si (KR); Eun Joo Kim, Uiwang-si (KR); Seong Moon Jung, Daejeon (KR); Hyun Jae Kim, Seoul (KR)

(73) Assignee: LG HAUSYS, LTD., Seoul (KR)

( * ) Notice: Subject to any disclaimer, the term of this patent is extended or adjusted under 35 U.S.C. 154(b) by 17 days.

(21) Appl. No.: 14/888,934

(22) PCT Filed: Apr. 1, 2014

(86) PCT No.: PCT/KR2014/002756
§ 371 (c)(1),
(2) Date: Nov. 3, 2015

(87) PCT Pub. No.: WO2014/178540
PCT Pub. Date: Nov. 6, 2014

(65) Prior Publication Data
US 2016/0082709 A1    Mar. 24, 2016

(30) Foreign Application Priority Data

May 3, 2013    (KR) ........................ 10-2013-0050044

(51) Int. Cl.
*B32B 27/08* (2006.01)
*B32B 27/30* (2006.01)
(Continued)

(52) U.S. Cl.
CPC .............. *B32B 27/306* (2013.01); *B32B 3/04* (2013.01); *B32B 5/02* (2013.01); *B32B 5/22* (2013.01);
(Continued)

(58) Field of Classification Search
CPC ..... Y10T 428/231; F16L 59/065; B32B 27/08
See application file for complete search history.

(56) References Cited

U.S. PATENT DOCUMENTS

| | | | |
|---|---|---|---|
| 6,182,850 B1 * | 2/2001 | Marbler | B65D 77/225 220/359.3 |
| 6,436,505 B2 * | 8/2002 | Kuroda | F16L 59/065 428/69 |

(Continued)

FOREIGN PATENT DOCUMENTS

| | | |
|---|---|---|
| CN | 101522416 A | 9/2009 |
| DE | 29613847 U1 | 9/1996 |

(Continued)

OTHER PUBLICATIONS

European Search Report dated Apr. 22, 2016 corresponding to European Patent Application No. 14791664.7 citing the above reference(s).

(Continued)

*Primary Examiner* — Alexander Thomas
(74) *Attorney, Agent, or Firm* — Hauptman Ham, LLP (57) ABSTRACT

Provided is an outer cover material for a vacuum insulator, sequentially comprising: one or more layers of a polyester film; a polyvinyl alcohol (PVOH) film adhered to a lower surface of the polyester film; and a sealing film adhered to a lower surface of the PVOH film. Also provided is a vacuum insulator, comprising a core material consisting of a fiberglass; and the outer cover material under internal pressure, accommodating the core material.

8 Claims, 6 Drawing Sheets

(51) Int. Cl.

| | | |
|---|---|---|
| *F16L 59/065* | (2006.01) | |
| *B32B 27/32* | (2006.01) | |
| *B32B 27/36* | (2006.01) | |
| *B32B 5/02* | (2006.01) | |
| *B32B 7/12* | (2006.01) | |
| *B32B 27/12* | (2006.01) | |
| *B32B 5/22* | (2006.01) | |
| *B32B 5/26* | (2006.01) | |
| *B32B 3/04* | (2006.01) | |
| *B32B 3/08* | (2006.01) | |

(52) U.S. Cl.
CPC .......... *B32B 5/26* (2013.01); *B32B 7/12* (2013.01); *B32B 27/08* (2013.01); *B32B 27/12* (2013.01); *B32B 27/32* (2013.01); *B32B 27/36* (2013.01); *F16L 59/065* (2013.01); *B32B 3/08* (2013.01); *B32B 2255/10* (2013.01); *B32B 2255/205* (2013.01); *B32B 2255/26* (2013.01); *B32B 2262/101* (2013.01); *B32B 2307/30* (2013.01); *B32B 2307/304* (2013.01); *B32B 2307/306* (2013.01); *B32B 2307/31* (2013.01); *B32B 2307/7242* (2013.01); *B32B 2307/7244* (2013.01); *B32B 2439/00* (2013.01); *B32B 2439/46* (2013.01); *B32B 2607/00* (2013.01)

(56) References Cited

U.S. PATENT DOCUMENTS

| | | |
|---|---|---|
| 2002/0090522 A1 | 7/2002 | Jacobsen et al. |
| 2008/0014435 A1* | 1/2008 | Smith ............... F16L 59/065 428/331 |
| 2012/0164365 A1 | 6/2012 | Jang et al. |
| 2014/0216100 A1* | 8/2014 | Toshimitsu ......... F16L 59/065 62/440 |

FOREIGN PATENT DOCUMENTS

| | | |
|---|---|---|
| KR | 1020040079861 A | 9/2004 |
| KR | 1020060053136 A | 5/2006 |
| KR | 1020070098486 A | 10/2007 |
| KR | 1020110044699 A | 4/2011 |
| KR | 1020120016743 A | 2/2012 |
| WO | 2008044549 A1 | 4/2008 |
| WO | 2012/023705 A2 | 2/2012 |

OTHER PUBLICATIONS

International Search Report for PCT/KR2014/002756 dated Jul. 7, 2014, citing the above reference(s).
Chinese Office Action for corresponding Chinese Patent Application No. 201480025127.7 dated Sep. 5, 2016, citing the above reference(s).

* cited by examiner

<Example 1>

<C. Example 1>

<C. Example 2>

OUTER COVER MATERIAL FOR VACUUM INSULATOR AND HIGH-PERFORMANCE VACUUM INSULATOR COMPRISING SAME

CROSS REFERENCE TO RELATED APPLICATION

This application claims the priority of Korean Patent Application No. 10-2013-0050044, filed on May 3, 2013 in the KIPO (Korean Intellectual Property Office). Further, this application is the National Phase application of International Application No. PCT/KR2014/002756 filed Apr. 1, 2014, which designates the United States and was published in Korean.

FIELD OF THE DISCLOSURE

The present disclosure relates to an outer cover material for a vacuum insulator and a high performance vacuum insulator comprising the same.

BACKGROUND OF THE DISCLOSURE

In the case of a currently commercially available vacuum insulator, the vacuum insulator comprises a core material and an outer cover material, wherein the core material comprises an inorganic compound, such as glass wool, fumed silica and aerogels, and the outer cover material comprises a sealing layer, such as nylon/PET/aluminum foil, or in addition to an aluminum deposition layer, polyethylene (PE), polypropylene (PP), and the like. Further, a getter material is employed to ensure long-term durability of the vacuum insulator, and comprises a humectant, such as calcium oxide (CaO), zeolite and silica gel, and a metal powder.

In particular, the outer cover material for the vacuum insulator is exposed to external impacts and external environmental changes, i.e., in external temperature and humidity, which influences the effects and performances of the vacuum insulator, and, therefore, continued researches are being conducted for the outer cover material for the vacuum insulator.

SUMMARY OF THE DISCLOSURE

One aspect of the present disclosure provides an outer cover material for vacuum insulator, which has good barrier performance without containing an aluminum foil.

Another aspect of the present disclosure provides a vacuum insulator, comprising an outer cover material for vacuum insulator, which has excellent thermal performance and long-term durability.

According to one embodiment of the disclosure, provided is an outer cover material for vacuum insulator, which sequentially includes one or more layers of a polyester film; a polyvinyl alcohol (PVOH) film adhered to a lower surface of the polyester film; and a sealing film adhered to a lower surface of the polyvinyl alcohol film.

In certain embodiments, the polyvinyl alcohol film may be about 10 µm to about 30 µm thick.

In certain embodiments, the polyvinyl alcohol film may be formed in a single layer or multi-layers.

In certain embodiments, the sealing film may include a non-oriented (casting polypropylene, CPP) film.

In certain embodiments, the sealing film may be about 20 µm to about 40 µm thick.

In certain embodiments, the polyester film may include one or more layers of an aluminum deposition film (e.g., Vacuum Metalized PolyEthylene Terephthalate film, VM-PET).

In certain embodiments, the aluminum deposition film may be about 5 µm to about 20 µm thick.

In certain embodiments, the polyester film, polyvinyl alcohol film and the sealing film may be adhered by a polyurethane-based resin, respectively.

In certain embodiments, the polyurethane-based resin may have an interlayer adhesive strength of about 200 gf/15 mm or more.

In certain embodiments, the outer cover material for vacuum insulator may not further include an aluminum foil.

According to another embodiment of the disclosure, provided is a vacuum insulator, including: a core material consisting of a fiberglass; and an outer cover material under internal pressure accommodating the core material.

In certain embodiments, the core material may be a laminate having one or more layers of boards comprising a fiberglass.

In certain embodiments, the core material may have a pore size of about 50 µm or less.

In certain embodiments, the vacuum insulator may further include a getter material attached to or inserted into the core material.

The outer cover material for vacuum insulator is excellent in barrier performance, such that it can effectively block the inflow of an external gas or moisture.

The vacuum insulator having an outer cover material for vacuum insulator can improve its thermal performance and long-term durability at the same time.

BRIEF DESCRIPTION OF THE DRAWINGS

The above and other objects and features of the present invention will become apparent from the following description of the invention, when taken in conjunction with the accompanying drawings, which respectively show.

DETAILED DESCRIPTION OF THE EMBODIMENTS

The present disclosure and methods of accomplishing the same may be understood more readily by reference to the following detailed description of embodiments and the accompanying drawings. However, the present disclosure may be embodied in many different forms, and should not be construed as being limited to the embodiments set forth herein. Rather, these embodiments are provided so that this disclosure will be thorough and complete and will fully covey the concept of the invention to those skilled in the art, and the present disclosure will only be defined by the appended claims. Like reference numerals designate like elements throughout the specification.

In the following detailed description, only certain exemplary embodiments of an outer cover material for vacuum insulator and a high performance vacuum insulator comprising the same according to the present disclosure have been shown and described, simply by way of illustration, with reference to the accompanying drawings.

Outer Cover Material for Vacuum Insulator

In one embodiment of the present disclosure, there is provided an outer cover material for vacuum insulator, which may include, sequentially, one or more layers of a polyester film; a polyvinyl alcohol (PVOH) film adhered to a lower surface of the polyester film; and a sealing film adhered to a lower surface of the polyvinyl alcohol film.

In a conventional vacuum insulator, an outer cover material is composed of a multilayer film mainly comprising a metal deposition film or an aluminum foil, and a core material comprises a fiberglass, fumed silica, and the like. Further, a getter material is applied to adsorb moisture, air and gas in the vacuum insulator. Meanwhile, since the pressure inside the vacuum insulator rises due to the ingress of the outside moisture and air, the thermal performance of the vacuum insulator becomes worse over time compared to an initial thermal performance.

For the conventional outer cover material comprising an aluminum foil, although it was excellent in barrier performance (moisture vapor permeability, or oxygen permeability) and long-term durability in vacuum insulator, a heat bridge phenomenon was generated due to the heat transfer caused by the aluminum foil, and thereby there was a problem that the thermal performance of the whole vacuum insulator became also deteriorated.

In order to overcome this problem, in place of the aluminum foil, an aluminum deposition film having an aluminum deposition layer was applied on one surface of the metal deposition film, such as polyethylene terephthalate film. In this case, however, such heat bridge phenomenon was substantially suppressed, but the long-term durability became worse, which therefore rendered difficult the use in an outer cover material for vacuum insulator.

Figure 1:
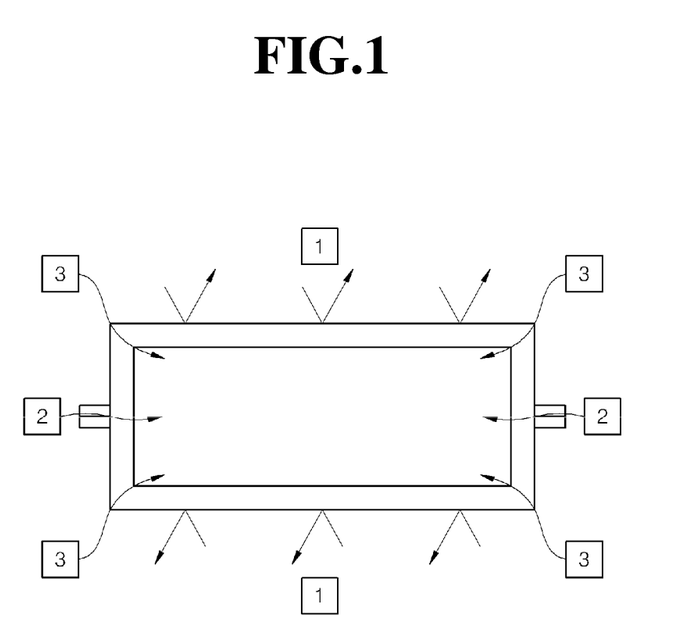
FIG. 1 shows paths 1, 2 and 3 through which moisture and air outside a vacuum insulator are infiltrated into an interior thereof.

FIG. 1 shows paths 1, 2 and 3 through which moisture and air outside a vacuum insulator are infiltrated into an interior thereof. Referring to FIG. 1, there may be three paths through which external moisture and air enter into the vacuum insulator.

For the conventional outer cover material comprising an aluminum foil, no air infiltration may occur in direction 1, but the outer moisture and air may be infiltrated through a sealed portion in direction 2, and through a folded portion of the outer cover material in direction 3 which renders lower the barrier performance. This have triggered the inclusion of an aluminum foil into the most of the outer cover material to improve he barrier performance, which, however, sacrifices the long-term durability.

On the contrary, the present disclosure provides an outer cover material for vacuum insulator excellent in the thermal performance and long-term durability, even without containing an aluminum foil which may generate a heat bridge to the outer cover material for vacuum insulator.

The outer cover material for vacuum insulator may include, in sequentially layered form, one or more layers of a polyester film; a polyvinyl alcohol (PVOH) film adhered to a lower surface of the polyester film; and a sealing film adhered to a lower surface of the PVOH film.

Figure 2:
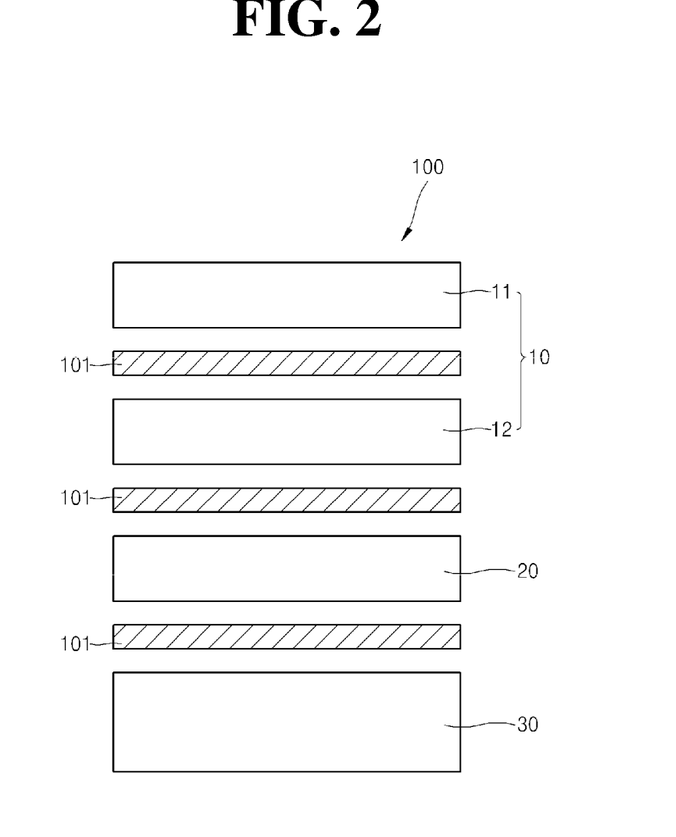
FIG. 2 shows an exploded cross-sectional view of an outer cover material for vacuum insulator according to an embodiment of the present disclosure.

FIG. 2 shows an exploded cross-sectional view of an outer cover material for vacuum insulator according to an embodiment of the present disclosure. Referring to FIG. 2, the outer cover material 100 for vacuum insulator may include, from the top, a polyester film 10, a polyvinyl alcohol (PVOH) film 20, and a sealing film 30.

For vacuum insulator where a fiberglass is applied as a core material, the vacuum insulator is usually made in the form of a panel whose edge portions are protruded, and thus the outer cover material for vacuum insulator may inevitably be folded. Even though the outer cover material is folded, but the barrier performance shall not be deteriorated, and thereby moisture and air are not allowed to infiltrate the folded portions of the outer cover material.

Specifically, the folded portions of the aforementioned outer cover material may be direction 3 in FIG. 1. The infiltration of moisture and air caused by the folded portions is largely effected by PVOH film 20 in the outer cover material, but in spite of the several folding of such PVOH film 20, there is no degradation in the barrier performance, that is, excellent barrier performance can be maintained.

The PVOH film 20 may be about 10 µm to about 30 µm thick. The PVOH film provides advantage to improve the barrier performance by maintaining its thickness within the above-described rages, and therefore the improvement of the long-term durability of the vacuum insulator can readily be implemented.

The PVOH film may be formed in a single layer or multi-layers. The PVOH film can act as a barrier layer to block the inflow of the external gas or moisture, wherein the PVOH film 20 may not include an aluminum foil.

The conventional barrier layer typically includes an aluminum foil in order to block the inflow of the external gas or moisture. However, the PVOH film does not include an aluminum foil, so the heat bridge caused by the aluminum foil can be suppressed, and therefore the outer cover material for vacuum insulator having both excellent initial performance and long-term durability can be obtained.

In addition, the PVOH film is holding up well in a high temperature, and despite its several folding, the barrier performance of the PVOH film is better than that of ethylene vinyl alcohol (EVOH) film. Therefore, in spite of the folding and bending phenomena of the outer cover material inherently generated when producing a vacuum insulator, the PVOH film may still act to block the inflow of the outer gas or moisture, and the deterioration of the barrier performance, etc. due to the folding and bending will not be occurred.

On the other hand, a polyethylene film is applied to the conventional sealing layer. The polyethylene film has an oxygen permeability of about 3000 cc/m$^2$ day to about 4000 cc/m$^2$ day moisture, and the barrier performance is not good, and moreover the barrier performance at high temperature is degraded dramatically.

As described above, for direction 2 in FIG. 1, as the external moisture and air is infiltrated, it is largely affected by a sealing film 30, wherein the sealing film 30 may include a casting polypropylene (CPP) film.

The sealing film 30 can include a non-oriented (casting polypropylene, CPP) film having excellent barrier performance, which can maximize the barrier performance of the outer cover material for vacuum insulator having the PVOH film 200, and the sealing film 30 can be brought into close contact with a surface of the core material.

The CPP film is an excellent heat resistant film applied to the conventional sealing film, and has excellent barrier performance compared to the polyethylene film at ambient temperature as well as at even higher temperature, and therefore may be distinguishably used as the sealing film 30 adhered to the core material.

The CPP film has an oxygen permeability of about 1300 $cc/m^2$ day moisture at room temperature, which is approximately one third of the polyethylene film. For moisture vapor permeability, the polyethylene film has a degree of about 14 $g/m^2$ day, while the CPP film has about 7 $g/m^2$ day, which maintains the half of the moisture vapor permeability of the polyethylene film. Therefore, the sealing film 30 can excellently block the infiltration of the external moisture and air through direction 2 by comprising the CPP film.

Specifically, the sealing film 30 may be about 20 µm to about 40 µm thick. The sealing film has an advantage of reducing the amount of moisture and air infiltrated into the sealing film by keeping the thickness within the above range, and as a result, the long-term durability of the vacuum insulator can be readily improved.

The outer cover material for vacuum insulator may include one or more layers of a polyester film on the PVOH film 20. The polyester film can act as a protective layer to protect from external impacts, while at the same time can act as a barrier layer to block the inflow of the external gas or moisture. Further, the polyester film may include PVOH film on the lower surface thereof, thereby maximizing the barrier performance of the vacuum insulator by the use of PVOH film.

Specifically, the polyester film 10 may include one or more layers of an aluminum deposition films 11 and 12 (Vacuum Metalized PolyEthylene Terephthalate Film, VM-PET), and one or more layers of the VM-PET films may be laminated to maximize the barrier performance or the protection performance of the outer cover material for vacuum insulator against the external impacts or external conditions.

As used herein, the VM-PET films 11 and 12 refer to a film that has an aluminum deposition layer over one surface of the polyethylene terephthalate film. The VM-PET film having an optical density (OD) of at least about 3.0 can obtain the barrier performance. Further, when using the VM-PET films 11 and 12, the aluminum deposition layer having a thickness of at least about 500 Å can obtain the barrier performance.

The VM-PET films 11 and 12 may be about 5 µm to about 20 µm thick. If the VM-PET film keeps the thickness within these ranges, the stiffness of the outer cover material can be reasonably maintained, thereby minimizing the defect rate that may occur in the manufacture of the vacuum insulator.

More specifically, since the aluminum deposition film has an aluminum deposition layer on one surface of the PET film, and so the PET film may be exposed to the exterior. When the aluminum deposition layer is positioned at the outermost, the aluminum may be oxidized and some scratches or cracks may be occurred due to a finger or an external impact.

Therefore, by placing the aluminum deposition layer on the interior, and placing the PET film on the exterior, it is possible to minimize the impact from the exterior of the aluminum deposition film, while at the same time ensuring the barrier performance to block the inflow of the external gas or moisture.

The polyester film, the polyvinyl alcohol film and the sealing film may be adhered by a polyurethane-based resin, respectively. Further, an interlayer adhesive strength of the polyurethane-based resin may be equal to or greater than 200 gf/15 mm. Referring to FIG. 2, the adhesives 101 located between each of the films to bond the films may be a polyurethane resin.

As described above, the outer cover material 100 for vacuum insulator may include a laminated structure that can minimize the heat transfer and at the same time can increase the barrier performance. In certain embodiments, for example, the process for preparing the outer cover material 100 can include preparing two layers of VM-PET film in order to maximize the barrier performance, applying a PVOH film on a lower surface of the VM-PET film to maintain the barrier performance at the folded portions of the outer cover material, and applying a CPP film on a lower surface of the PVOH film to maximize the barrier performance at the sealing regions.

It is noted that the outer cover material for vacuum insulator does not further include an aluminum foil, and therefore the heat bridges that may occur by the inclusion of the aluminum foil cannot be generated, thereby preventing the deterioration of the overall thermal performance.

Vacuum Insulator

In another embodiment of the disclosure, there is provided a vacuum insulator, including: a core material comprising a fiberglass; and an outer cover material under internal pressure accommodating the core material.

Figure 6:
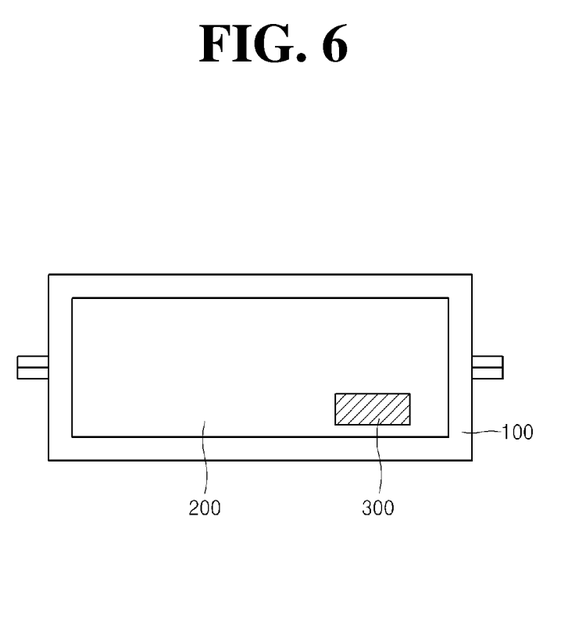
FIG. 6 shows an exploded cross-sectional view of a vacuum insulator according to another embodiment of the present disclosure.

FIG. 6 shows an exploded cross-sectional view of the vacuum insulator according to another embodiment of the disclosure. In this embodiment, the vacuum insulator can include a core material 200, an outer cover material 100, and a getter material 300.

The core material 200 may be made of a fiberglass. Any known core material may be used without limitation, as long as it has a thermal insulation property, and, for example, the core material 200 can include, but is not limited to, glass wool, glass boards, pearlite, fumed silica, and aerogel.

Specifically, the core member 200 does not include an organic and inorganic binder, or the core material 200 may be formed in a laminated form, where boards comprising a fiberglass in a stirred aqueous solution containing water or an organic compound are laminated to form one or more layers, or a fiberglass assembly having a diameter of about 1 µm to about 10 µm, or a glass wool comprising an organic/inorganic binder and a board may be laminated to form one or more layers.

The core material may have a pore size of about 50 µm or less, and specifically, may be about 30 µm. The pore size in the core material is meant by pores in the microporous structure in a porous body. In this regard, according to the present core material, it refers to the pore size between the fiberglass formed by the fiberglass. When using a core material with an outer cover material containing a polyester film, a polyvinyl alcohol film and a sealing film at the same time, if the pore size of the core material is greater than about 50 µm, the performance in the vacuum insulator is lowered over time, which therefore renders difficult to ensure the long-term durability.

On the other hand, if the pore size of the core material is about 50 µm or less, since this small pore size makes relatively slow the heat transfer by the convection of the gas infiltrated from outer environment, even when the same amount of gas is infiltrated into the vacuum insulator, the long term durability thereof can be improved.

The outer cover material 100 for the vacuum insulator is as described above. The outer cover material 100 for vacuum insulator can include, sequentially, one or more layers of a polyester film; a polyvinyl alcohol (PVOH) film adhered to a lower surface of the polyester film; and a sealing film adhered to a lower surface of the polyvinyl alcohol film.

For a vacuum insulator made using the conventional outer cover material for the vacuum insulator, containing an aluminum foil, the thermal conductivity of a center portion of the vacuum insulator (direction 1 in FIG. 1) is low, but the thermal conductivity of an edge portion (direction 3 in FIG. 1) is high, and therefore the thermal conductivity for the whole vacuum insulator became about two to about three times worse. As such, the thermal conductivities measured vary from positions, such as a center portion and an edge portion of the vacuum insulator. In this regard, the thermal conductivity for the entire area of the vacuum insulator is referred to as an effective thermal conductivity.

In practical, the effective thermal conductivity is associated with consumption efficiency of refrigerator or energy savings of building, which is one of the valuable physical properties in the vacuum insulator. For example, when using an outer cover material for vacuum insulator containing an aluminum foil as a barrier layer to prepare a vacuum insulator with a size of 450 mm×900 mm×20 mm, the thermal conductivity of the center portion of the vacuum insulator is about 3.5 mW/mK, but the effective thermal conductivity is about 9.6 mW/mK, which is greater than the value of the center portion of the vacuum insulator. It can be found that the heat bridges caused by an aluminum foil comprised in the outer cover material for the vacuum insulator make greater the difference between the thermal conductivities in the center portion and the edge portion.

However, when an outer cover material for vacuum insulator having barrier performance including PVOH film is applied to the vacuum insulator, the thermal conductivity in the center portion of the vacuum insulator is about 3.5 mW/mK, and the effective thermal conductivity is measured about 4.7 mW/mK, which indicates that the difference between the thermal conductivities in the center portion and the edge portion of the vacuum insulator is not large.

Therefore, the thermal performance can be improved, that is, the heat transfer can be minimized, by the use of the outer cover material comprising the PVOH film, without comprising an aluminum foil.

In addition, the thermal performance of the vacuum insulator can be improved, and at the same time the pore size of the outer cover material may be about 50 μm or less, by the use of the outer cover material without including an aluminum foil, and therefore the long term durability of the vacuum insulator can be secured by controlling the pore size of the core material to about 50 μm or less, whereby the vacuum insulator having both excellent thermal performance and long term durability can be provided.

Figure 5:
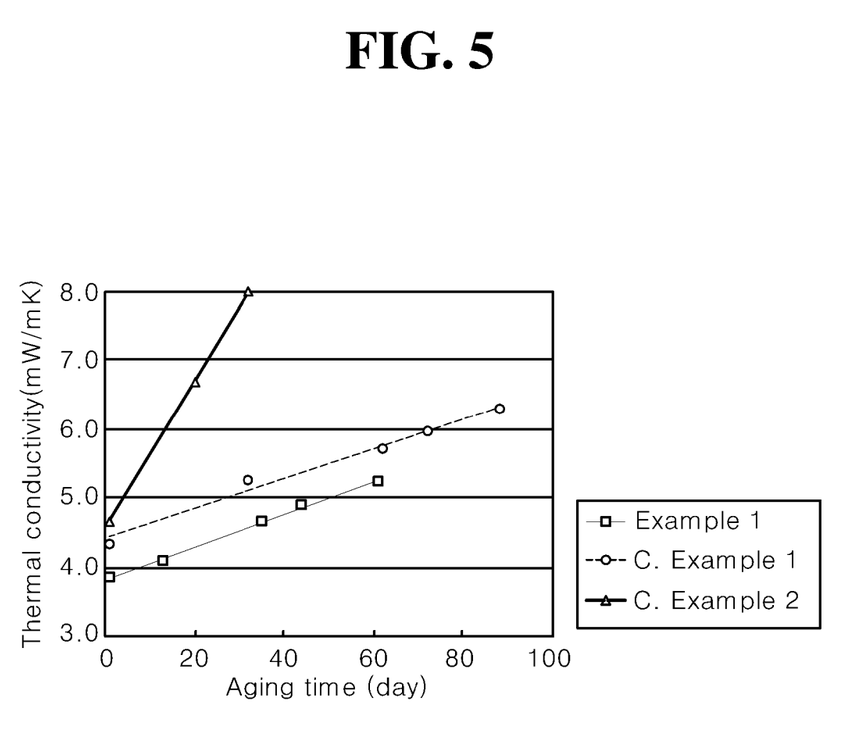
FIG. 5 graphically shows thermal conductivities over time in vacuum insulators comprising an outer cover material for vacuum insulator according to Example 1, and Comparative Examples 1 and 2.

Further, the vacuum insulator may further include a getter material 300 for the purpose of absorbing moisture inside the vacuum insulator. The getter material 300 is attached to or inserted into the core material. In FIG. 5, there is illustrated the embodiment having the getter material 300 inserted into the core material 100.

The getter material 300 may include calcium oxide (CaO) powder having 95% or more purity, and may include at least one material selected from the group consisting of zeolite, cobalt, lithium, active carbon, aluminum oxide, barium, calcium chloride, magnesium oxide, magnesium chloride, iron oxide, zinc, and zirconium.

Hereinafter, the present disclosure will be described in more detail with reference to some specific examples thereof. However, the following examples are provided for illustration only and are not to be construed as limiting the present disclosure in any way.

EXAMPLES AND COMPARATIVE EXAMPLES

Example 1

First, at least one 5 mm thick plate-shaped boards, which include an inorganic binder including a fiberglass aggregate having a diameter of 1 μm to 6 μm and silica, were laminated to form a complex. A core material having a pore size of 50 μm was used as the core material for vacuum insulator. In this case, a getter material prepared in the form of a pouch including 5 g of calcium oxide having 95% purity was inserted into the core material.

Next, an outer cover material for vacuum insulator including, from the top, two layers of VM-PET film 12 μm, PVOH film 15 μm and CPP film 30 μm was prepared, and then the films were laminated using a polyurethane-based resin.

Next, the core material was inserted into the outer cover material, and then sealed under vacuum condition of 1 Pa to provide a vacuum insulator in the size of 200 mm×200 mm×8 mm.

Example 2

A vacuum insulator was prepared in the same way as Example 1, except that the pore size of the core material for vacuum insulator was 80 μm.

Comparative Example 1

A vacuum insulator was prepared in the same way as Example 1, except that the outer cover material for vacuum insulator included, from the top, polyethylene terephthalate film (PET) 12 μm, nylon film 25 μm, Al foil 7 μm and linear low density polyethylene (LLDPE) film 50 μm.

Comparative Example 2

A vacuum insulator was prepared in the same way as Example 1, except that the outer cover material for vacuum insulator included, from the top, three layers of VM-PET film 12 μm and a linear low density polyethylene (LLDPE) film 50 μm.

Figure 3:
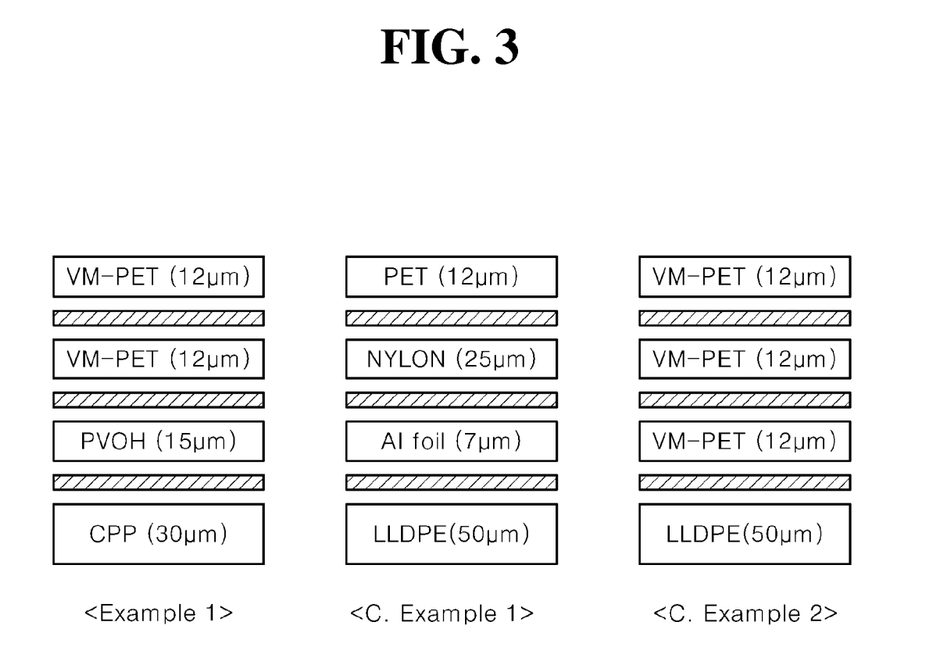
FIG. 3 shows exploded cross-sectional views of outer cover materials for vacuum insulator according to Example 1, and Comparative Examples 1 and 2.

FIG. 3 shows exploded cross-sectional views of the outer cover materials for vacuum insulator according to Example 1, and Comparative Examples 1 and 2.

Experimental Example 1—Long Term Durability of the Vacuum Insulator

The vacuum insulator according to Examples 1 and 2 were placed in a constant temperature chamber at 70° C., 90% RH, respectively, and maintained three months, during which period the thermal conductivity was measured using thermal conductivity meter HC-074-200 (commercially available from EKO Corp.).

TABLE 1

| | Thermal conductivity (mW/Mk) | | |
|---|---|---|---|
| | 1 month | 2 months | 3 months |
| Example 1 | 3.5 | 3.7 | 4.1 |
| Example 2 | 3.7 | 5.9 | 8.2 |

Figure 4:
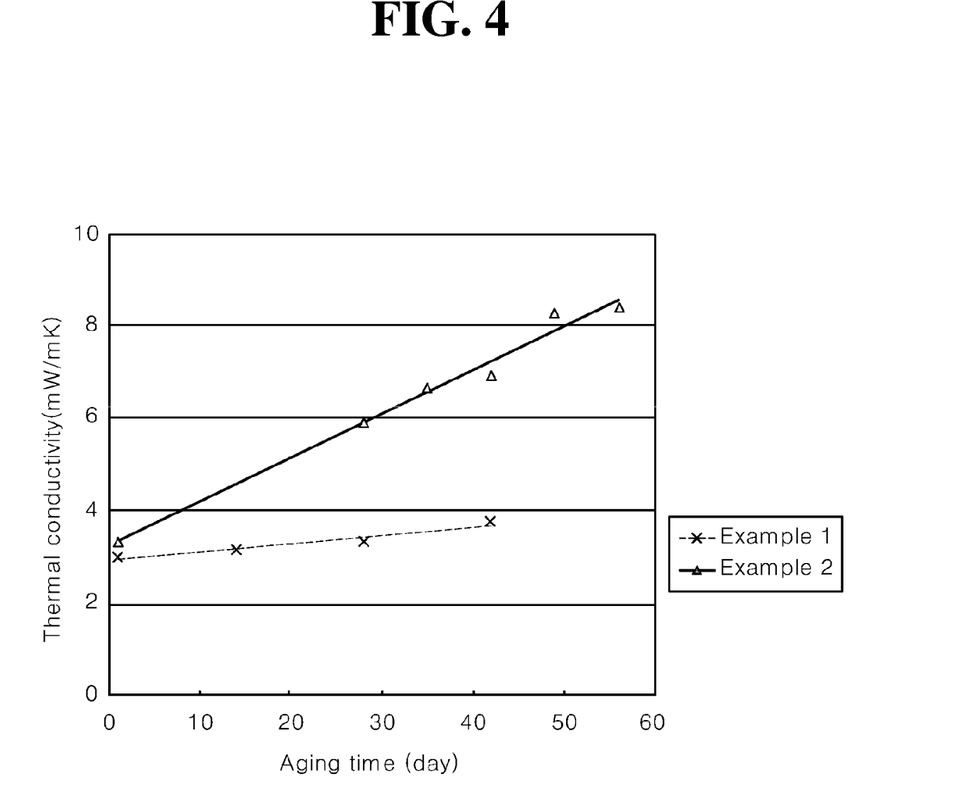
FIG. 4 graphically shows thermal conductivities over time in vacuum insulators comprising an outer cover material for vacuum insulator according to Examples 1 and 2.

FIG. 4 graphically shows the thermal conductivities over time in vacuum insulators comprising the outer cover material for vacuum insulator according to Examples 1 and 2. With reference to Table 1 and FIG. 4, the thermal conductivity of the vacuum insulator according to Example 1 was lower than that of the vacuum insulator according to Example 2.

Specifically, the pore size of the core material in Example 1 was less than 50 μm, while the pore size of the core material in Example 2 exceeds 50 μm. In this case, the thermal conductivity of Example 1 was kept lower than that of Example 2 over time, which demonstrated that the long term durability of Example 1 was more excellent than Example 2.

Therefore, it has been found that the heat transfer characteristics and the long term durability can be secured for the vacuum insulator by comprising the outer cover material including PVOH film, without aluminum foil, and the core material having a pore size of about 50 μm or less at the same time.

Experimental Example 2—Heat Conductivity of Vacuum Insulator

The vacuum insulator according to Example 1, and Comparative Examples 1 and 2 were placed in a constant temperature chamber at 85° C., respectively, and maintained three months, during which period the thermal conductivity was measured using thermal conductivity meter HC-074-200 (commercially available from EKO Corp.).

TABLE 2

| | Thermal conductivity (mW/Mk) | | |
|---|---|---|---|
| | 1 month | 2 months | 3 months |
| Example 1 | 3.9 | 4.5 | 5.1 |
| C. Example 1 | 4.3 | 5.1 | 5.8 |
| C. Example 2 | 4.6 | 7.5 | 10.4 |

FIG. 5 graphically shows the thermal conductivities over time in the vacuum insulators comprising the outer cover material for vacuum insulator according to Example 1, and Comparative Examples 1 and 2. With reference to Table 2 and FIG. 5, the thermal conductivity of the vacuum insulator according to Example 1 was lower than that of the vacuum insulator according to Comparative Examples 1 and 2.

Specifically, it has been found that Example 1 comprising the outer cover material for vacuum insulator exhibiting barrier performance by including PVOH or PVOH film and VM-PET film was also significantly excellent in the long term durability as compared to Comparative Example 1 comprising an aluminum foil in the outer cover material for vacuum insulator.

Further, it has been found that Example 1 had a generally low thermal conductivity and excellent long term durability as compared to Comparative Example 2 which did not include a separate PVOH film or an aluminum foil.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Accordingly, the scope of the present disclosure shall be determined only according to the attached claims.

The invention claimed is:

1. An outer cover material for a vacuum insulator, the outer cover material sequentially comprising:
    a first vacuum metalized poly ethylene terephthalate (VM-PET) film;
    a second VM-PET film adhered to a lower surface of the first VM-PET film;
    a polyvinyl alcohol (PVOH) film adhered to a lower surface of the second VM-PET film; and
    a sealing film adhered to a lower surface of the PVOH film,
    wherein
        the sealing film is a casting polypropylene (CPP) film,
        the first VM-PET film, second VM-PET film, PVOH film and CPP film are adhered by a polyurethane-based resin, respectively,
        the first VM-PET film includes a first aluminum deposition layer over one surface of a first polyethylene terephthalate (PET) film,
        the second VM-PET film includes a second aluminum deposition layer over one surface of a second PET film,
        the first PET film is exposed to the exterior,
        the first aluminum deposition layer is placed on the interior and between the first PET film and the second PET film,
        the second PET film is placed between the first aluminum deposition layer and the second aluminum deposition layer,
        the second aluminum deposition layer is placed between the second PET film and the PVOH film, and
        the outer cover material is free from an aluminum foil,
    wherein the PVOH film has a thickness of 10 μm to 30 μm, the CPP film has a thickness of 20 μm to 40 μm, and each of the first and second VM-PET film has a thickness of 5 μm to 20 μm,
    wherein the optical density of the first and the second VM-PET film is not less than 3.0,
    wherein the thickness of the first and the second aluminum deposition layer is not less than 500 Å, and
    wherein the CCP film is thicker than the polyvinyl alcohol film, the polyvinyl alcohol film is thicker than each of the first and second VM-PET film.

2. The outer cover material according to claim 1, wherein the PVOH film is a multi-layered PVOH film.

3. The outer cover material according to claim 1, wherein the polyurethane-based resin has an interlayer adhesive strength of 200 gf/15 mm or more.

4. A vacuum insulator, the vacuum insulator comprising:
    a core material consisting of a fiberglass; and
    an outer cover material accommodating the core material, said outer cover material comprising,
        a first vacuum metalized poly ethylene terephthalate (VM-PET) film,
        a second VM-PET film adhered to a lower surface of the first VM-PET film,
        a polyvinyl alcohol (PVOH) film adhered to a lower surface of the second VM-PET film, and
        a sealing film adhered to a lower surface of the PVOH film,
    wherein
        the core material has a pore size of 50 μm or less,
        the sealing film is a casting polypropylene (CPP) film,
        the first VM-PET film, second VM-PET film, PVOH film and CPP film are adhered by a polyurethane-based resin, respectively, the first VM-PET film includes a first aluminum deposition layer over one surface of a first poly ethylene terephthalate (PET) film, the second VM-PET film includes a second aluminum deposition layer over one surface of a second PET film, the first PET film is exposed to the exterior, the first aluminum deposition layer is placed on the interior and between the first PET film and the second PET film, the second PET film is placed between the first aluminum deposition layer and the second aluminum deposition layer, the second aluminum deposition layer is placed between the second PET film and the PVOH film, and the outer cover material is free from an aluminum foil, wherein the PVOH film has a thickness of 10 μm to 30 μm, the CPP film has a thickness of 20 μm to 40 μm, and each of the first and second VM-PET film has a thickness of 5 μm to 20 μm, wherein the optical density of the first and the second VM-PET film is not less than 3.0, wherein the thickness of the first and the second aluminum deposition layer is not less than 500 Å, wherein the CCP film is thicker than the polyvinyl alcohol film, the polyvinyl alcohol film is thicker than each of the first and second VM-PET film.

5. The vacuum insulator according to claim 4, wherein the core material is a laminate having multi-layered board comprising the fiberglass.

6. The vacuum insulator according to claim 4, further comprising a getter material attached to or inserted into the core material.

7. The vacuum insulator according to claim 4, wherein the PVOH film is a multi-layered PVOH film.

8. The vacuum insulator according to claim 4, wherein the polyurethane-based resin has an interlayer adhesive strength of 200 gf/15 mm or more.

* * * * *